(No Model.) 2 Sheets—Sheet 1.

T. PARKER.
ADJUSTABLE SLUICEWAY GATE OR DAM.

No. 426,953. Patented Apr. 29, 1890.

WITNESSES.

Thomas Parker
Inventor By
Charles N. Woodward
Atty.

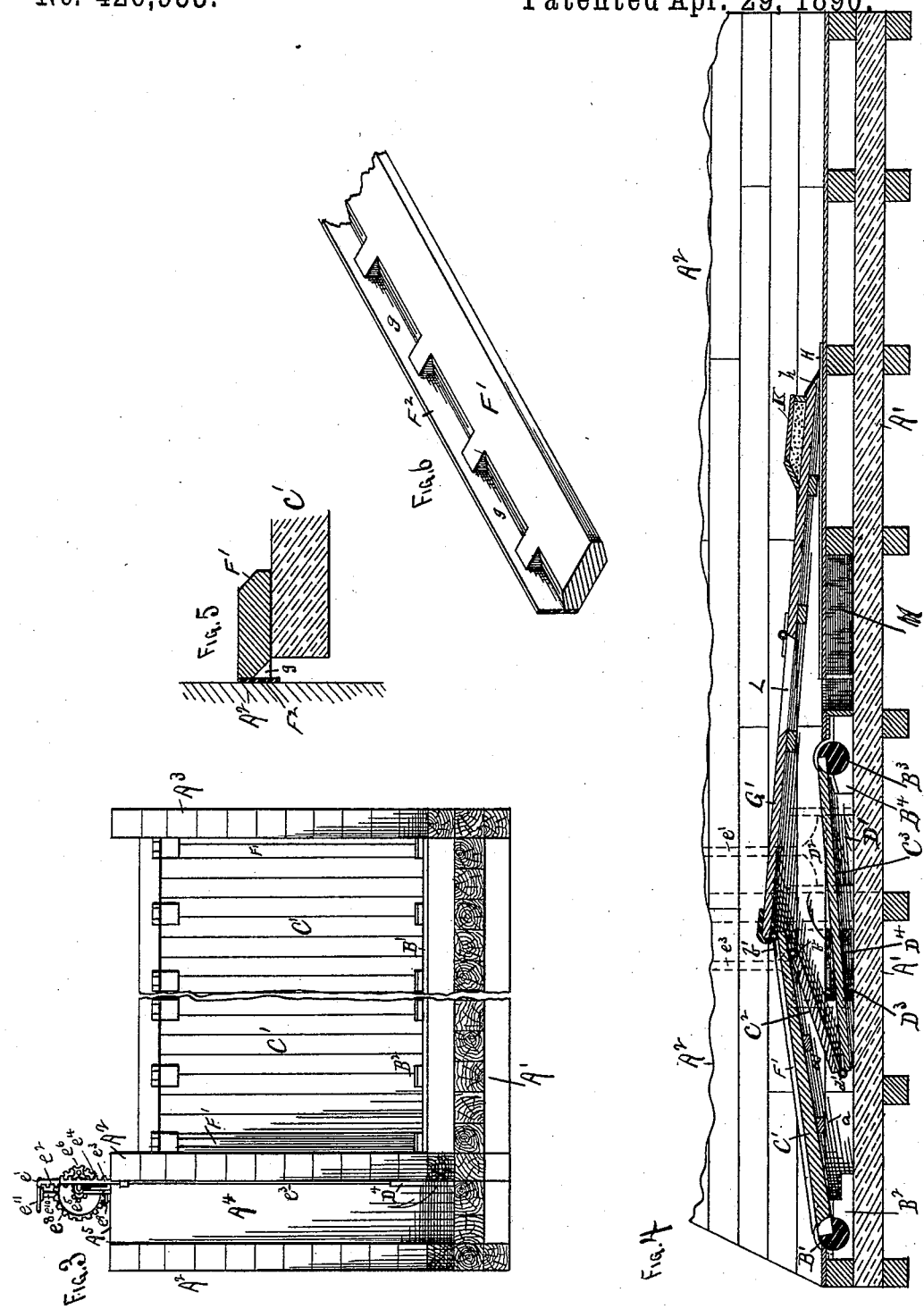

UNITED STATES PATENT OFFICE.

THOMAS PARKER, OF MENOMONEE, WISCONSIN.

ADJUSTABLE SLUICEWAY GATE OR DAM.

SPECIFICATION forming part of Letters Patent No. 426,953, dated April 29, 1890.

Application filed November 5, 1888. Serial No. 289,958. (No model.)

*To all whom it may concern:*

Be it known that I, THOMAS PARKER, a citizen of the United States, residing at Menomonee, in the county of Dunn and State of Wisconsin, have invented certain new and useful Improvements in Sluiceway and Flood Gates or Adjustable Roll-Dams, of which the following is a specification.

This invention relates to the gates used in mill and other dams for sluicing logs, for canal-locks, &c., and for "flooding" ponds and streams, and is an improvement on my patent, No. 372,040, dated October 27, 1887; and the invention consists in the construction whereby the gate is made self-operating by the pressure of the water which is used to elevate the gate, and also in the manner of constructing the gate, whereby it may be held poised at any desired point of elevation, as hereinafter shown and described, and specifically pointed out in the claims.

Figure 1:
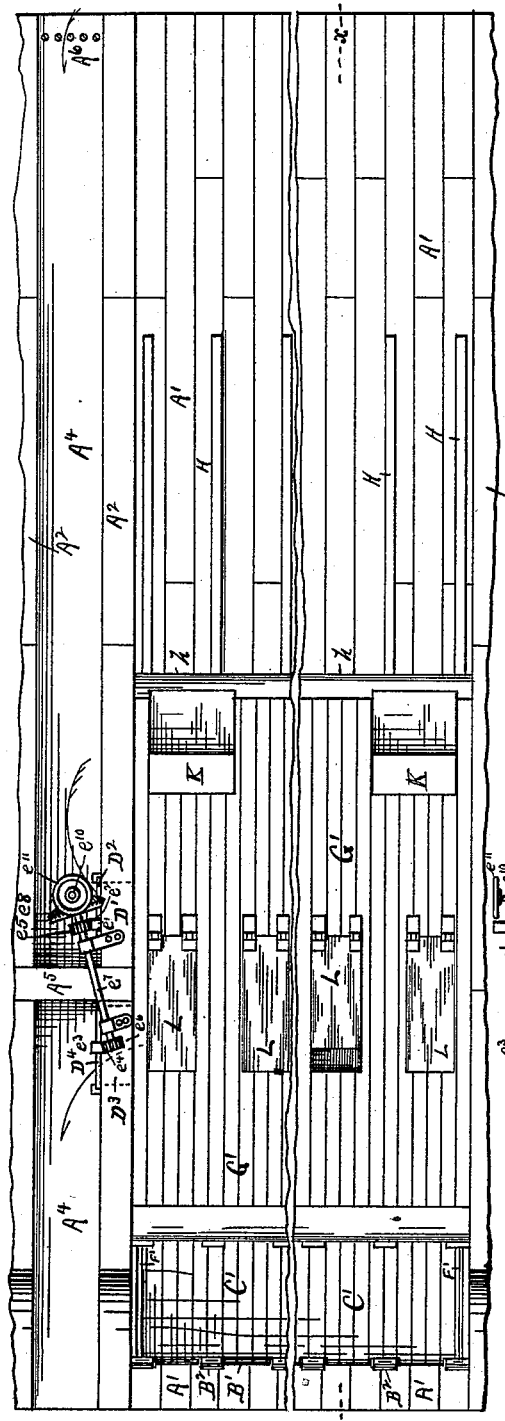
Figure 2:
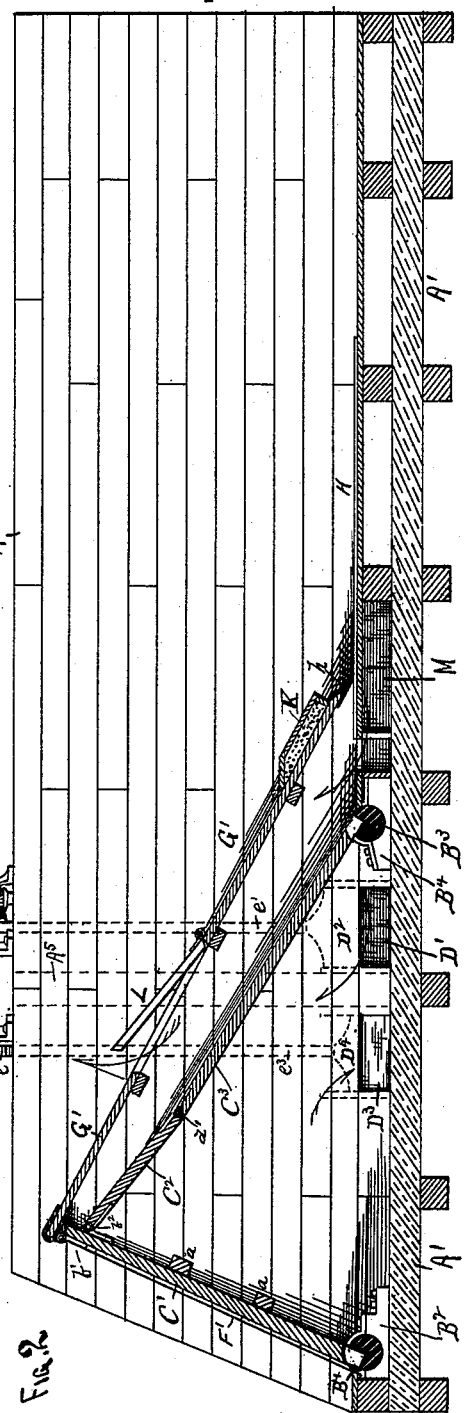

In the drawings, Figure 1 is a plan view, and Fig. 2 is a sectional side elevation, on the line $x$ $x$ of Fig. 1, showing the gate elevated. Fig. 3 is a front elevation of the gate as shown in Fig. 2. Fig. 4 is a view, similar to Fig. 2, of the bed and a portion of the cribbing, showing the position of the gate when depressed. Figs. 5 and 6 are enlarged details illustrating the manner of forming the "stop-water" or packing upon the sides of the gates.

A′ represents the "bed" of the sluiceway, and $A^2$ $A^3$ the cribbing forming the walls or sides. The bed and cribbing may be of any desired or well-known form—timber-work or stone-work, or of any other construction; but for the purpose of illustration I have shown it formed of timber-work in the ordinary manner.

Across the "downstream" end of the bed A′ a roller or circular timber B′ is journaled in suitable bearings $B^2$, secured to the bed A′, and attached by one end to this roller is the gate proper C′, constructed of plank or timbers bolted firmly together, and further strengthened by cross-timbers $a$ upon the under side, as shown.

$B^3$ is another roller some distance in the rear of the roller B′, and similarly journaled to the bed A′ by bearings $B^4$. The free end $b'$ of the gate C′ is connected to this second roller $B^3$ by a jointed section consisting of the two parts $C^2$ $C^3$, the part $C^2$ joined to the free end of the gate C′ at $b^2$, and the part $C^3$ joined to the roller $B^3$, while the two parts are jointed together at $d'$, as shown, so that when the gate C′ is depressed, as in Fig. 4, the two parts $C^2$ $C^3$ will fold in beneath the gate, and when the gate is elevated, as in Fig. 2, the two sections will form a back or rear wall to the space beneath the gate.

A flume $A^4$ is formed in the space between the main walls, into which the water will freely flow from the upstream end of the dam, the flume being provided with a stop-wall $A^5$, by which the water is prevented from flowing entirely through the flume. The flume $A^4$ is connected to the space beneath the gate by a feed-port D′, supplied with a valve or gate $D^2$, by which the flow of the water therethrough may be shut off, if required, this feed-port being placed so that it opens into the sluiceway beneath the gate C′ and the folding sections $C^2$ $C^3$, as shown, and is not covered by the change of position of the gate when being elevated or depressed. Through the wall of the flume $A^4$, below the stop-wall $A^5$ or into the downstream portion of the flume, is a port $D^3$, having a discharge valve or gate $D^4$, by which the outflow may be shut off, if required.

The feed-gate $D^2$ is adapted to be opened and closed from the top of the cribbing by a rod $e'$, passing upward to a point a short distance above the cribbing and having a gear-rack $e^2$ on one side, while the gate $D^4$ is likewise provided with a rod $e^3$, having a rack $e^4$, the rack $e^2$ being on the opposite side of its rod $e'$ from the rack $e^4$ on its rod $e^3$, so that pinions $e^5$ $e^6$ on a diagonally-set cross-shaft $e^7$, while engaging with both of the racks, will run one gate upward, while it runs the other downward, and vice versa, thereby closing one gate while opening the other, or operating the gates alternately. The shaft $e^7$ has a large bevel-gear $e^8$, with which a bevel-pinion $e^9$ on an upright shaft $e^{10}$ engages, the act of turning the hand-wheel $e^{11}$ on the shaft $e^{10}$ to the right opening the gate $D^2$, and the act of turning it to the left opening the gate $D^4$.

By arranging the gates so that they are operated through the gearing $e^8$ $e^9$, I gain greatly in power thereby, so that the gate may be operated more easily.

In Fig. 4 the gate C' is shown depressed, with the feed-gate $D^2$ closed and the discharge-gate $D^4$ open, so that the water is free to flow out from beneath the gate, but cannot enter beneath it from the flume $A^4$; hence the pressure of the water above the gate will be sufficient to keep it down upon the bed A'.

When it is desired to elevate the gate, the positions of the valves are reversed by simply turning the hand-wheel $e^{11}$, which will open the feed-valve $D^2$ and close the discharge-valve $D^4$, permitting the water to flow beneath the gate, but not permitting it to escape therefrom.

The difference in altitude between the water at the upstream end and at the point where it passes beneath the gate creates a pressure sufficient to overcome the pressure of the water on the outside of the gate, and thus forces the gate upward and holds it elevated so long as the valve $D^4$ is kept closed and the valve $D^2$ kept open, or, in other words, the water in falling through the flume $A^4$ into the space beneath the gate exerts a greater pressure beneath the gate than the pressure of the water in the sluiceway outside the gate; hence the gate will be elevated and kept elevated, as before described. Then, again, the gate can be supported at any required point of elevation by adjusting the gates $D^2$ $D^4$ partially open or partially closed, so as to permit a greater or less quantity of water to pass through the valves, and the position of the gate C' may thus be perfectly and readily determined by merely turning the hand-wheel $e^{11}$. This is a very important feature of my invention, as it avoids the necessity for employing any extra mechanism for supporting the gate at any point below its highest elevation.

The jointed sections $C^2$ $C^3$ form an essential part of the gate proper, being the only means with which I am acquainted by which the main section C' can be depressed from a perpendicular or from an angle above about thirty degrees from the horizontal, which is effected, as before stated, by drawing the water from beneath the gate through port $D^3$, when the port D' is closed, and thereby decreasing the pressure beneath the gate and allowing the pressure of the water entering through the port M to act upon the jointed sections and fold them down into the position shown in Fig. 4.

When the gate is to be lowered again, the positions of the valves $D^2$ $D^4$ are again reversed, the discharge-valve $D^4$ being opened to permit the water beneath the gate to flow out and downstream, and the feed-valve $D^2$ being closed to prevent any more water flowing in beneath the gate, the outflowing of the water removing the pressure of the water from beneath the gate and causing the pressure of the water through the port to act upon the double sections $C^2$ $C^3$ and force the gate into the position shown in Fig. 4 as fast as the water escapes by the port $D^3$.

The bed A' of the sluiceway is formed with a depression where the gate C' is placed, so that when the gate is lowered, as in Fig. 4, it covers this depression and forms a part of the bed of the sluiceway. By this means the presence of the gate does not affect the sluiceway or materially lessen its size.

The flume $A^4$ may be constructed of a separate conduit or tube, or in any other desired manner, but generally it will form part of the main sluiceway, as in the drawings. The entrance to the flume will be guarded by a rack $A^6$ to prevent the entrance of drift material or other foreign matter that would clog the gates or valves.

In Figs. 5 and 6 I have shown the method of forming the stop-water or "packing," by which the water is prevented from flowing past the gate C' when it is elevated, consisting simply of a wooden bar F', having a rubber or other similar suitable flexible strip $F^2$, the bars being attached to the outside of the gate along its edges next to the walls $A^2$ $A^3$ of the sluiceway with the rubber in close contact therewith, so that the water cannot pass between them.

The bars F' will be formed with cavities $g$ along their under sides to give the water a better opportunity to act upon the rubber.

G' represents an "idler-section," jointed by one end to the free end b' of the gate C' and resting by its lower end upon ways H along the bed A' of the sluiceway. The idler-section is intended to move with the gate C' as it rises and falls, to cover the folding sections, and to prevent drift-wood or other obstructions from getting between the folding sections when the gate is depressed, and also to assist logs in passing over the gate. The lower edge of the idler-section is armed with a metal "toe-plate" $h$, somewhat "chisel-edged," so that it will rest at all times in close contact with the bed and prevent sediment and other foreign matter from passing under the idler section into the space between it and the folding sections, but will cause such material to pass upward and over the gate. The idler-section will also be provided with a series of doors L, opening outward to provide a more ready means of exit for the water beneath the section, so that when the gate is lowered the water between it and the jointed sections $C^2$ $C^3$ can pass directly into the main sluiceway and not be required to pass into the flume $A^4$ against the pressure of the water therein. These doors L will be either of boiler-iron or of wood with weights attached, so that they will remain closed when the gate is elevated or being elevated, and open only when the pressure beneath the section G' is greater than that above it.

In the drawings I have shown the idler-section provided with weights K', formed of boxes of gravel or stones secured to their lower ends to overcome the buoyancy and prevent the section from rising when submerged.

M is a port or opening connecting the space beneath the idler-section G' with the flume A⁴, so that the water is free to flow beneath the idler-section and preserve the equilibrium and prevent any variation in the pressure on the two sides of the section. This makes a very simple and efficient sluiceway and floodgate and does not require any mechanism for elevating and depressing it, but is entirely automatic in its action. It is entirely submerged when depressed, and is exposed only when the water is lower than its upper end $b'$, which very rarely occurs. The gate is thus protected by the water and is not exposed to the change from wet to dry or with a portion above the water and a portion below the water, which always has a bad effect upon the durability of gates.

The gate may be made of any width or height to adapt it to any size of dam or to wide or narrow streams.

The cribbing may be supplied with one or more of the flumes A⁴, if required, but generally only one will be required, as shown, and one or more of the feed or discharge valves may be employed, as required.

As many of the inlet and discharge valves may be used as required.

I have shown the gates and bed broken apart to illustrate the fact that they may be made of any required width and to enable the drawings to be made upon a larger scale.

The rollers B' B³ may be of iron, if preferred, which will be advantageous under some circumstances.

When the dam is built in locations where the bed of the stream is of rock, the rollers B' B³ will generally be connected to the bed by eyebolts.

This form of gate will be found very convenient and practicable as a canal-lock gate.

Having thus described my invention, what I claim as new is—

1. A sluiceway-gate consisting of a main section C', jointed to the bed of the sluiceway at its downstream end and connected to the bed of the sluiceway at its upstream end by jointed sections C² C³, adapted to fold beneath said main section when said main section is lowered, and one or more feed-valves connecting the space beneath said sections with the source of supply for said sluiceway, and one or more discharge-valves adapted to discharge the water from beneath said sections, and an idler-section G', jointed to the upstream end of said main section and adapted to run upon the bed of said sluiceway and rise and fall with said gate, and having doors L therein, whereby the water beneath said idler-section can escape when the gate is being lowered, substantially as and for the purpose set forth.

2. The combination, in a sluiceway-gate, of the main section C', jointed sections C² C³, idler-section G, having doors L, and provided with weights K, flume A⁴, and open port M, whereby the equilibrium is preserved upon both sides of said idler-section and its buoyancy overcome, substantially as and for the purpose set forth.

3. A sluiceway-gate consisting of main section C', jointed to the bed of the sluiceway at its downstream end and connected to the bed of the sluiceway at its upstream end by jointed sections C² C³, adapted to fold beneath said main section when said main section is lowered, said section C² being shorter than said section C³, whereby when the sections are folded down the section C³ is not entirely covered by the section C², but a portion left exposed to the direct downward pressure of the water, as and for the purpose set forth.

In testimony whereof I have hereunto set my hand in the presence of two subscribing witnesses.

THOMAS PARKER.

Witnesses:
C. N. WOODWARD,
H. S. WEBSTER.